US009919691B2

United States Patent
Ohlig et al.

(10) Patent No.: US 9,919,691 B2
(45) Date of Patent: Mar. 20, 2018

(54) MOTOR VEHICLE BRAKE, IN PARTICULAR A MOTOR VEHICLE BRAKE THAT CAN BE ACTUATED IN A COMBINED HYDRAULIC AND ELECTROMECHANICAL MANNER, COMPRISING A MULTI-STAGE SPINDLE

(71) Applicant: Lucas Automotive GmbH, Koblenz (DE)

(72) Inventors: Benedikt Ohlig, Vallendar (DE); Erwin Michels, Kail (DE)

(73) Assignee: Lucas Automotive GmbH, Koblenz (DE)

( * ) Notice: Subject to any disclaimer, the term of this patent is extended or adjusted under 35 U.S.C. 154(b) by 52 days.

(21) Appl. No.: 15/117,937

(22) PCT Filed: Feb. 17, 2015

(86) PCT No.: PCT/EP2015/053253
§ 371 (c)(1),
(2) Date: Aug. 10, 2016

(87) PCT Pub. No.: WO2015/124545
PCT Pub. Date: Aug. 27, 2015

(65) Prior Publication Data
US 2016/0355169 A1    Dec. 8, 2016

(30) Foreign Application Priority Data
Feb. 19, 2014   (DE) .................. 10 2014 002 484

(51) Int. Cl.
*B60T 13/74* (2006.01)
*F16D 65/18* (2006.01)
(Continued)

(52) U.S. Cl.
CPC ............ *B60T 13/741* (2013.01); *F16D 65/18* (2013.01); *F16D 2121/04* (2013.01);
(Continued)

(58) Field of Classification Search
CPC .......... F16D 65/14; F16D 65/18; F16D 65/16; F16D 2121/04; F16D 2121/24;
(Continued)

(56) References Cited

U.S. PATENT DOCUMENTS 3,895,695 A * 7/1975 Hunter .................. B60T 13/261
                                                                188/170
6,145,634 A   11/2000 Holding
(Continued)

FOREIGN PATENT DOCUMENTS

DE        3220283 A1   12/1983
DE       19519310 A1   11/1996
(Continued)

OTHER PUBLICATIONS

German Search Report, Application No. DE 10 2014 002 484.9, dated Oct. 29, 2014.
(Continued)

*Primary Examiner* — Melanie Torres Williams
(74) *Attorney, Agent, or Firm* — MacMillan, Sobanski & Todd, LLC

(57) ABSTRACT

The invention relates to a motor vehicle brake, in particular a motor vehicle brake that can be actuated in a combined hydraulic and electromechanical manner, having an actuator assembly comprising: a housing, an actuating element that can be displaced relative to the housing along a longitudinal axis for the hydraulic or electromechanical displacement of a brake lining, a motor drive, and a displacement mechanism, arranged between the motor drive and the displaceable actuating element, for displacing the actuating element. The displacement mechanism has a multi-stage spindle-nut arrangement comprising a first spindle-nut pair having a first thread pitch and a second spindle-nut pair having a second thread pitch, wherein the first thread pitch is greater than the
(Continued)

second thread pitch, wherein, during an electromechanical actuation of the motor vehicle brake, the first spindle-nut pair is active in a first actuating phase and the second spindle-nut pair is active in a second actuating phase.

12 Claims, 3 Drawing Sheets

(51) Int. Cl.
    *F16D 121/04*     (2012.01)
    *F16D 121/24*     (2012.01)
    *F16D 123/00*     (2012.01)
    *F16D 125/40*     (2012.01)
    *F16D 125/48*     (2012.01)

(52) U.S. Cl.
    CPC ...... *F16D 2121/24* (2013.01); *F16D 2123/00* (2013.01); *F16D 2125/40* (2013.01); *F16D 2125/405* (2013.01); *F16D 2125/48* (2013.01)

(58) Field of Classification Search
    CPC ............. F16D 2123/00; F16D 2125/40; F16D 2125/405; F16D 2125/48; B60T 13/741; B60T 13/74
    See application file for complete search history.

(56) References Cited

U.S. PATENT DOCUMENTS

| | | |
|---|---|---|
| 8,327,981 B2 | 12/2012 | Giering et al. |
| 8,616,348 B2 | 12/2013 | Winkler et al. |
| 2012/0160618 A1* | 6/2012 | Salzmann ............... F16D 65/18 188/72.7 |
| 2012/0292141 A1* | 11/2012 | Takahashi ............... F16D 65/18 188/72.3 |

FOREIGN PATENT DOCUMENTS

| | | |
|---|---|---|
| DE | 19913939 A1 | 9/1999 |
| DE | 69625490 T2 | 10/2003 |
| DE | 102005036863 A1 | 2/2007 |
| DE | 102011080714 A1 | 12/2012 |
| WO | 2008037738 A1 | 4/2008 |
| WO | 2009046899 A1 | 4/2009 |

OTHER PUBLICATIONS

PCT International Search Report and Written Opinion, Application No. PCT/EP2015/053253, dated Oct. 1, 2015.
PCT International Preliminary Report on Patentability, Application No. PCT/EP2015/053253, dated Jan. 28, 2016.

* cited by examiner

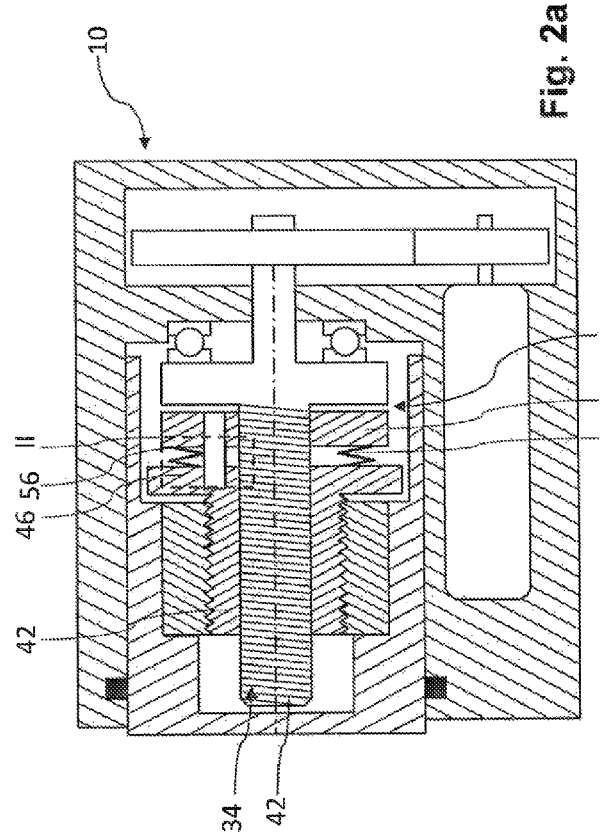
Fig. 2a
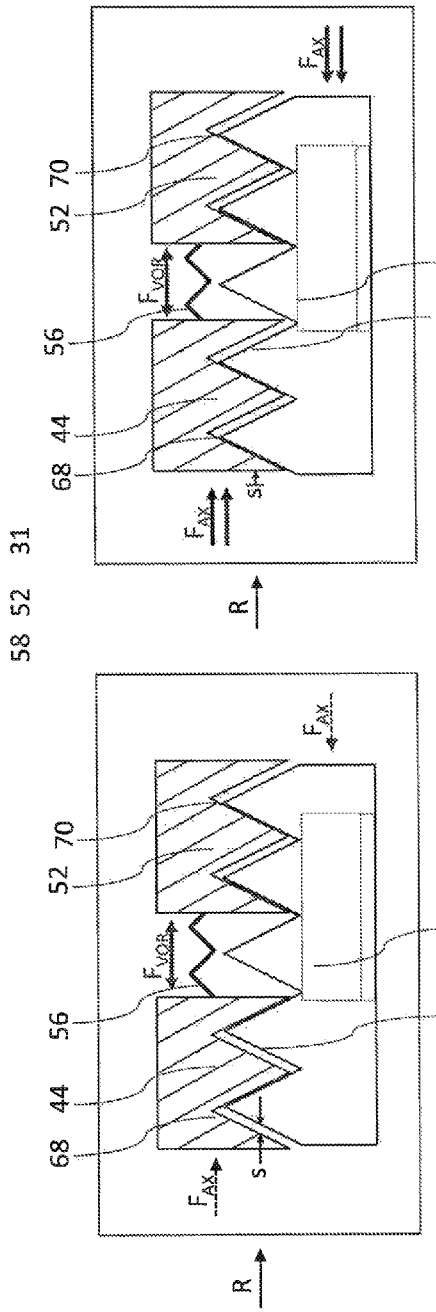
Fig. 2b
Fig. 2c

MOTOR VEHICLE BRAKE, IN PARTICULAR A MOTOR VEHICLE BRAKE THAT CAN BE ACTUATED IN A COMBINED HYDRAULIC AND ELECTROMECHANICAL MANNER, COMPRISING A MULTI-STAGE SPINDLE

CROSS-REFERENCE TO RELATED APPLICATIONS

This application is a national stage of International Application No. PCT/EP2015/053253 filed 17 Feb. 2015, the disclosures of which are incorporated herein by reference in entirety, and which claimed priority to German Patent Application No. 10 2014 002 484.9 filed 19 Feb. 2014, the disclosures of which are incorporated herein by reference in entirety.

BACKGROUND OF THE INVENTION

The present invention relates to a motor vehicle brake, in particular a motor vehicle brake that can be actuated in a combined hydraulic and electromechanical manner, having an actuator assembly comprising: a housing, an actuating element that is displaceable relative to the housing along a longitudinal axis for the hydraulic or electromechanical displacement of a brake lining, a motor drive, and a displacement mechanism, situated between the motor drive and the displaceable actuating element, for displacing the actuating element.

Motor vehicle brakes of this type are already known from the prior art.

The document WO 2008/037738 A1 describes a motor vehicle brake that can be actuated in a combined hydraulic and electromechanical manner. In a normal operating situation, i.e., during travel of the motor vehicle, this motor vehicle brake is hydraulically actuated in the customary manner. For activating a parking brake, the electromechanical actuating function is activated. In the process, an electric motor is actuated which drives a spindle-nut arrangement via a displacement mechanism having a gear system. The gear system has a self-locking design with a worm gear to prevent reduction of the parking brake action when the parking brake is activated. The special feature of the motor vehicle brake described in this prior art lies in the configuration of the spindle-nut arrangement, in which the rolling elements do not rotate, but instead are pretensioned via a spring. One disadvantage of this motor vehicle brake is that during an electromechanical actuation, a relatively large actuating travel must be overcome, which may take a very long time until the desired clamping action with the desired brake force is achieved. In addition, this design is relatively complicated.

In addition, the document WO 2009/046899 A1 describes a motor vehicle brake that is electromechanically actuatable. However, the electromechanical actuation takes place for activating the service brake function as well as for activating the parking brake function. For this reason, the gear system has a nonself-locking design. This motor vehicle brake has the advantage that no hydraulic system is necessary for its actuation, and instead the vehicle electrical system may be used to actuate the braking system. Since the gear system has a nonself-locking design, for locking the motor vehicle brake for the parking brake function, a separate locking device is provided in which a lever may be magnetically brought into a locking position. In this prior art, an application force reserve is also provided to compensate for settling processes on the brake linings due to cooling or the like after applying the brake in parking brake operation. Here as well, this motor vehicle brake has the disadvantage that a significant amount of time may elapse before the desired clamping action is achieved.

BRIEF SUMMARY OF THE INVENTION

A feature of the present invention is to provide a motor vehicle brake that can be actuated in a combined hydraulic and electromechanical manner, which may be utilized as a service brake as well as a parking brake, and which, with a simple design and also using a relatively low-power electric motor drive, allows a reduction in the time for achieving the desired clamping action.

This feature is achieved by a motor vehicle brake of the type described at the outset, in which it is provided that the displacement mechanism has a multi-stage spindle-nut arrangement comprising a first spindle-nut pair having a first thread pitch, and a second spindle-nut pair having a second thread pitch, wherein the first thread pitch is larger than the second thread pitch, wherein during an electromechanical actuation of the motor vehicle brake, the first spindle-nut pair is active in a first actuating phase and the second spindle-nut pair is active in a second actuating phase.

The present invention provides that a multi-stage spindle-nut arrangement is provided which comprises a first spindle-nut pair and a second spindle-nut pair whose thread pitches have different sizes. In an actuating phase of the electromechanical actuation of the motor vehicle brake according to the invention, initially the spindle-nut pair having the large thread pitch acts, so that it is possible to pass relatively quickly through a clearance of the brake corresponding to the large thread pitch. As soon as the clearance is passed through and the actuating element has been displaced far enough that a brake lining coupled to the actuating element rests against a brake disc, the resistance against further displacement for clamping the brake increases. As a result, it is necessary to press the brake lining via the actuating element with sufficient force against the brake disc so that the desired damping action (brake force) is achieved. This actuating phase is referred to as the second actuating phase, in which the spindle-nut pair having the smaller thread pitch is active.

The invention thus makes use of a multi-stage spindle-nut arrangement to achieve a rapid displacement of the actuating element in the first actuating phase, in which a small axial force counteracts the displacement of the actuating element. In the second actuating phase, in which a relatively larger axial force counteracts the displacement of the actuating element, the clamping action is achieved by means of the spindle-nut pair having the smaller thread pitch. This switchover between different thread pitches as a function of the counteracting axial force also allows use of a lower-power drive motor.

One refinement of the invention provides that the transition from the first actuating phase to the second actuating phase is determined by an axial force threshold value acting on the actuating element. It may be provided that the axial force threshold value is dimensioned such that during the first actuating phase, the actuating element is displaceable for passing through a brake clearance, and during the second actuating phase, the actuating element is displaceable for building up a desired brake force.

With regard to the structural design of the motor vehicle brake according to the invention, it may be provided that the first spindle-nut pair has a first spindle and a first nut, the first nut being rotatably fixed relative to the actuating element, preferably accommodated in the actuating element in a rotatably fixed manner or formed in one piece with same, and the first spindle being rotatably drivable by the motor drive.

In addition, it may be provided that the second spindle-nut pair has a second spindle and a second nut, the second nut being coupleable to the actuating element in a rotatably fixed manner, and the second spindle being rotatably drivable by the motor drive.

To achieve the desired switchover function between the individual stages of the spindle-nut arrangement, one embodiment of the invention provides that the second nut of the second spindle-nut pair has two parts, a first nut section being coupled in a rotatably fixed manner to a second nut section via a connecting pin, but being displaceable relative to the second nut section in the axial direction, the first nut section and the second nut section being stretched apart from one another in the axial direction via a compression spring mechanism. The connecting pin is fixed in the first nut section, for example and is displaceably guided via a through opening in the second nut section. Of course, it is also possible to fix the pin in the second nut section (by pressing or the like) and to guide the displaceable first nut section through same. It is important for the two nut sections to be coupled in a rotatably fixed manner via the connecting pin.

The compression spring mechanism causes the two nut sections to be stretched, i.e., spread, apart from one another. If the spindle associated with the second nuts, with their two nut sections, and their thread are viewed in the axial direction, the internal thread of the first nut section is pressed by the compression spring mechanism against thread flanks of the spindle leading in the viewing direction, whereas the internal thread of the second nut section is pressed against differently oriented, i.e., trailing, thread flanks of the spindle. The compression spring mechanism is correspondingly pre-tensioned, and thus ensures relatively high static friction between the two nut sections and the spindle associated therewith. The two nut sections are braced, so to speak, on the spindle by the compression spring mechanism and the axial force which it exerts, similarly as for two mutually locked nuts. As a result, in this braced state a relative rotation of the second nut, comprising the two nut sections, relative to the spindle is much more difficult, as a function of the magnitude of the axial force exerted by the compression spring mechanism. In contrast, a relative rotation between the first spindle and the first nut associated therewith is much easier, i.e., has much lower resistance.

When the multi-stage spindle-nut arrangement is now driven, this means that in a state in which the compression spring mechanism fully develops its action, and the two nut sections of the second nut are braced (locked) relative to the second. spindle, essentially only the first spindle-nut pair is active. This allows use to be made of the relatively large thread pitch of the first spindle-nut pair in the first actuating phase. If the axial force acting on the actuating element now increases in conjunction with the electromechanical actuation, due to the fact that a brake lining displaced by the actuating element rests against a brake disc, an axial force which grows with an increasing clamping action is exerted by the first spindle-nut pair on the second nut section of the second spindle-nut pair. This axial force acts against the axial force exerted by the compression spring mechanism for spreading the two nut sections apart, and increasingly reduces the bracing of the two nut sections, i.e., the locking action of the compression spring mechanism. In the process, the second nut section in conjunction with the thread play is displaced in the direction of the first nut section, this movement being axially guided by the connecting pin. Ultimately, the two nut sections in each case rest with their internal thread only against flanks of the external thread of the second spindle running in the same direction, so that the locking action is completely eliminated. The second nut then acts as a conventional nut, despite its two-part design, and the torque transmission takes place between the two nut sections via the connecting pin. In this state, in the present case also referred to as the second actuating phase, the further drive motion of the actuating element is effectuated essentially solely by the second spindle-nut pair. The first spindle-nut pair remains essentially passive due to its relatively large thread pitch.

Relatively high clamping forces may be achieved in the desired area via the second spindle-nut pair which has the relatively small thread pitch. In contrast, the first spindle-nut pair brings about a rapid displacement of the actuating element, and thus of the brake lining, for quickly passing through the clearance.

It is understood that when the braking effect is released in conjunction with an electromechanical actuation, the device is active in the reverse sequence. Initially the second spindle-nut pair is active, until the bracing via the compression spring mechanism builds up again between the two nut sections. As a result, the first spindle-nut pair is active in order to quickly restore the clearance.

It may preferably be provided according to the invention that an axial elastic force exerted by the compression spring mechanism is dimensioned for stretching apart the first and second nut sections for setting the axial force threshold value. The point in time of the switchover between the first and the second actuating phase may be specified, depending on the design of the compression spring mechanism and the axial elastic force which it exerts. For this purpose, the compression spring mechanism may have one or more compression springs of different types, for example conventional spiral springs, disc springs, elastomeric pressure elements, or the like.

One refinement of the invention provides that the first spindle of the first spindle-nut pair is coupled in a rotatably fixed manner to the second nut section of the second nut of the second spindle-nut pair, or is formed in one piece with same. It is thus possible to cost-effectively design the first spindle and the second nut section of the second nut as an integral part.

One refinement of the invention provides that the first spindle-nut pair has a self-locking design, preferably with a tapered thread or trapezoidal thread, or a ball screw drive with the braking or locking system. In addition, it may be provided according to the invention that the second spindle-nut pair has a self-locking design, preferably with a tapered thread or a trapezoidal thread. The self-locking is necessary in each case to prevent the motor vehicle brake from being inadvertently released.

One refinement of the invention provides that a preferably multi-stage gear system, situated between the motor drive and the spindle-nut arrangement, is associated with the displacement mechanism. This makes it possible to provide a relatively low-power motor drive and still achieve high brake application forces in the area of the spindle-nut arrangement via a suitable gear system having an adequate gear ratio.

Other advantages of this invention will become apparent to those skilled in the art from the following detailed description of the preferred embodiments, when read in light of the accompanying drawings.

BRIEF DESCRIPTION OF THE DRAWINGS

FIG. 2a shows the illustration according to FIG. 1 in a reduced-scale view, but with a marked detail;

FIG. 2b shows the detail marked by reference character II in FIG. 2a in conjunction with a first actuating phase;

FIG. 2c shows the detail marked by reference character II in FIG. 2a in conjunction with a second actuating phase.

DETAILED DESCRIPTION OF THE INVENTION

Figure 1:
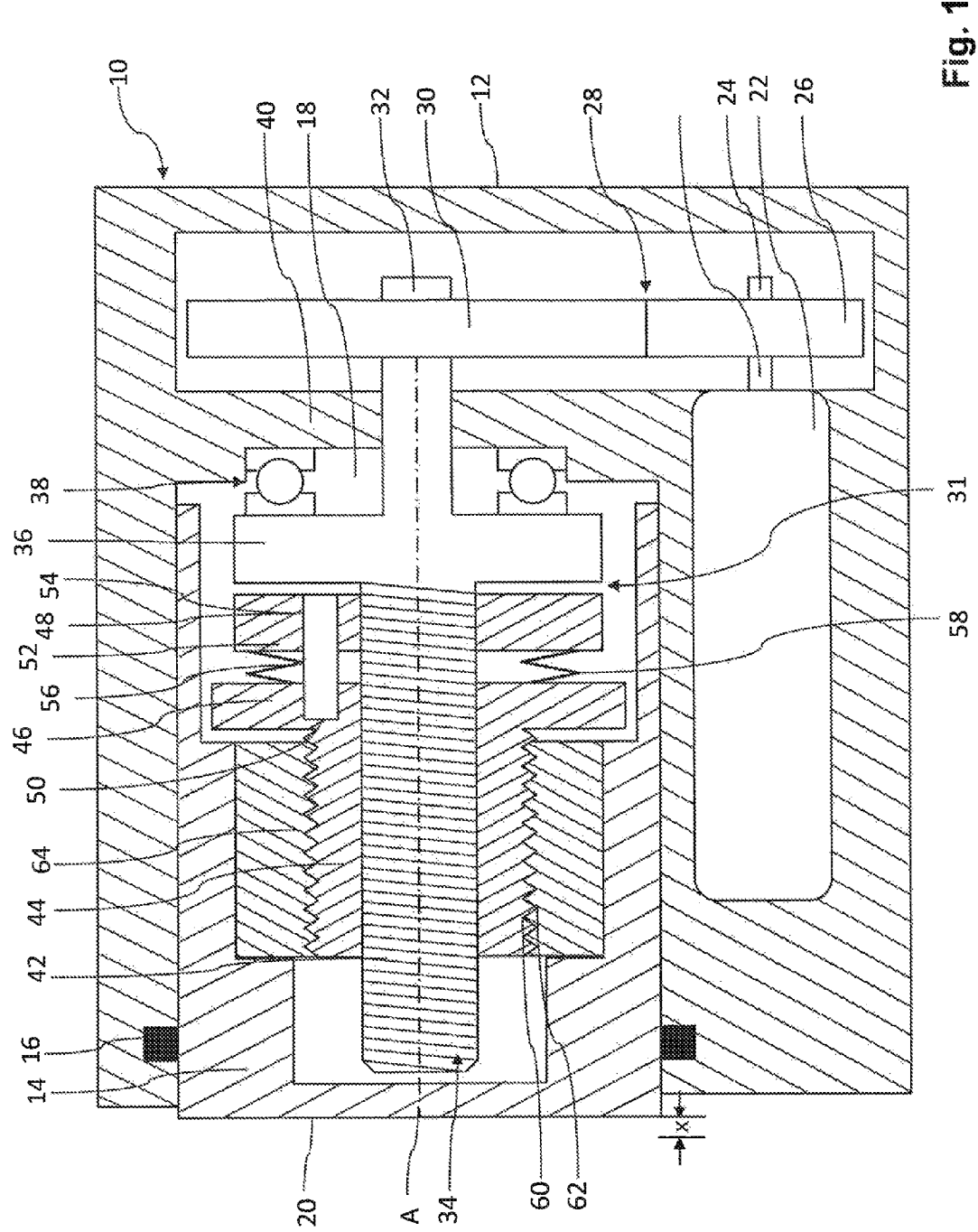
FIG. 1 shows a schematic overview illustration of the essential components of the motor vehicle brake according to the invention.

FIG. 1 shows a motor vehicle brake according to the invention, denoted in general by reference numeral 10. The motor vehicle brake includes a housing 12 in which an actuating element in the form of a hydraulic piston 14 and which is displaceable with respect to a longitudinal axis A is displaceably accommodated. The piston 14 is secured against rotation and is guided within the housing 12 via a fluid seal 16. The piston 14 may be displaced along the longitudinal axis A in a conventional manner by the action of brake fluid on a pressure chamber 18 in order to press a brake lining (not shown), coupled to an end face 20 of the piston 14, to a brake disc (likewise not shown) upon brake activation. The piston 14 returns to its starting position in the conventional manner due to release of the hydraulic fluid from the pressure chamber 18.

During actuation of the piston 14, the piston must initially be moved over a distance x which corresponds to a clearance that is present in the braking system. As soon as the distance x is overcome, the brake lining is applied to the brake disc, as the result of which a braking effect may be achieved. When the clearance is passed through corresponding to the magnitude x, the piston 14 experiences very little resistance. The counteracting axial forces in this actuating phase, referred to below as the first actuating phase, are essentially friction forces that are exerted by the seal 16 on the piston circumferential surface.

An electric motor 22 having an output shaft 24 is also provided in the housing 12. The rotatably driven output shaft 24 is coupled in a rotatably fixed manner to a first gearwheel 26 of a gear system 28. The gearwheel 26 meshes with a second gearwheel 30 of the gear system 28. The second gearwheel 30 is mounted in a rotatably fixed manner on a shaft shoulder 32. The shaft shoulder 32 is part of a threaded spindle 34, which is rotatably supported in the housing 12 via a spindle flange 36 by means of an axial bearing 38. The axial bearing 38 is supported at one end on the spindle flange 36, and at the other end is accommodated in a housing bar 40 that extends through the shaft shoulder 32.

A spindle-nut arrangement 31 includes the threaded spindle 34, which has an external thread 42 on its outer periphery. The external thread is in engagement with an internal thread of a nut section 44 of the spindle-nut arrangement 31. The nut section 44 has a socket-like design, and at its end area, to the right in FIG. 1, has a radially outwardly extending flange 46. In this flange 46, a connecting pin 48 is pressed into a receiving opening 50. The connecting pin 48 extends in the axial direction in FIG. 1 to a further nut section 52 of the spindle-nut arrangement 31. The nut section 52 has a receiving opening 54 which accommodates the connecting pin 48 in a slidably displaceable manner in the pin longitudinal direction, with a small amount of play. The nut section 52 also has an internal thread, which is in engagement with the external thread 42 of the spindle 34. Two compression springs 56, 58, which are under pretension in the state shown in FIG. 1, are situated between the two nut sections 44 and 52. This is discussed in greater detail below with reference to FIGS. 2a through 2c.

The nut section 44 has a further thread formation 60 on its outer circumferential surface. This thread formation is in engagement with an internal thread formation 62 of a nut 64. The nut 64, as part of the spindle-nut arrangement 31, is accommodated in a rotatably fixed manner inside the piston 14. The nut may also have an integral design as a region of the piston.

As indicated above, the piston 14 may be displaced strictly hydraulically by action of pressure on the pressure chamber 18. In addition, it is possible to also displace the piston 14 electromechanically by appropriate actuation of the motor drive 22. For this purpose, the motor output shaft 24 is rotatably driven via the electric motor 22. Torque is transmitted via the transmission gear system 28 to the spindle-nut arrangement 31. The piston 14 may be displaced via the spindle-nut arrangement 31, whose mode of operation is explained in greater detail below. This type of electromechanical actuation basically comes into consideration also in conjunction with conventional service braking (during travel). Presently, however, such electromechanical actuation is preferably used in the implementation of a parking brake function (electromechanical parking brake).

FIG. 2a shows the schematic illustration according to FIG. 1 in reduced scale. However, a detail II is apparent in FIG. 2a which is important for the mode of operation of the two-stage spindle-nut arrangement 31. As explained above, the two nut sections 44 and 52 are in threaded engagement with the spindle 34. These two nut sections 44 and 52 are braced against one another via the two compression springs 56 and 58, and are joined together in a torque-transmitting manner via the connecting pin 48. The axial force exerted by the compression springs 56 and 58 is referred to as pretensioning force FVOR in FIGS. 2b and 2c.

In a state in which the piston 14 is moved essentially without resistance, i.e., in which the piston 14 displaces the brake lining without this displacement being opposed by resistance from the brake disc (passing through the clearance x, referred to below as the first actuating phase), the pretensioning force FVOR exerted by the springs 56 and 58 causes the two nut sections 44 and 52 to be stretched, i.e., spread, apart from one another. It is apparent from viewing the enlarged section according to FIG. 2b that thread play s is present in each case between the external thread 42 of the spindle 34 and an internal thread 68 of the nut section 44 on the one hand, and an internal thread 70 of the nut section 52 on the other hand. This thread play allows slight movement of the particular nut sections 44, 52 relative to the spindle 34 in the axial direction. The spring pretensioning of the axial compression springs 56, 58, which results in the pretensioning force FVOR, causes the two nut sections 44 and 52 to be stretched apart from one another in conjunction with the thread play s, so that the thread flanks of the internal thread 68 of the nut section 44, facing the observer in an axial viewing direction R, are pressed against the thread flanks of the external thread 42 of the spindle 34 facing away from the observer in the viewing direction R. In contrast, the thread flanks of the internal thread 70 of the nut section 52 facing away from the observer are pressed against the thread flanks of the external thread 42 of the spindle 34 facing the observer. This corresponds to a state of two nuts which are locked together and braced, so to speak, against one another on a thread. It is generally known that, due to such a locked state, the two nuts, in the present case the two nut sections 44 and 52 on the external thread 42 of the spindle 34, at best may be moved only with significant effort.

This locked state of the two nut sections 44 and 52 via the pretensioning force persists as long as no, or only small, axial forces act on the piston 14. However, as soon as axial forces are exerted on the nut section 44 by the piston 14, as indicated by a dashed line arrow in FIG. 2b, in which the axial counterforce FAX is a supporting force which is diverted into the housing via the axial bearing 38, the compression springs 56, 58 are compressed opposite their pretensioning force FVOR. When sufficiently large axial forces FAX are present, as indicated in FIG. 2c, the nut section 44 is displaced in conjunction with the thread play s, so that in the same viewing direction R, ultimately the flanks of the nut section 44 facing the observer, similarly as for the nut section 52, rest against the flanks of the external thread 42 of the spindle 34 facing the observer. The two nut sections 44 and 52 are therefore no longer locked together, and with relatively little resistance may be rotated together on the spindle 34 by means of the connecting pin 48.

A switching or multi-stage capability of the spindle-nut arrangement may be achieved with the mode of operation of the two mutually braced nut sections 44 and 52 described with reference to FIGS. 2a through 2c. As long as the two nut sections 44 and 52 are braced against one another, i.e., locked on the spindle 34, a first spindle-nut pair formed from the external thread 60 of the nut section 44 and the internal thread 62 of the nut 64 is active. This thread pair has a relatively large thread pitch, and effectuates a relatively large actuator travel for a predefined angular rotation of the spindle 34. When the spindle 34 is rotatably driven, this rotational movement is essentially completely transmitted to the nut section 44. As a result, the nut 64 together with the piston 14 is displaced via the threaded engagement.

When the clearance x is overcome, so that the brake lining (not shown) is applied to the brake disc (not shown), the axial forces FAX acting on the piston 14 are significantly increased. These axial forces FAX are transmitted to the nut section 44 via the nut 64, and result in a transition from the state according to FIG. 2b into the state according to FIG. 2c. The relatively steep thread pair 60, 62 goes into its self-locking state, and causes no further displacement of the piston 14. In contrast, in the no longer locked state according to FIG. 2c, a further adjusting movement may take place via the flatter external thread 42 of the spindle 34. At the predefined angular rotation of the spindle 34, the subsequent brake application movement of the piston 14 is correspondingly less, but with higher torque, so that an appropriate clamping action may be achieved on the brake lining, not shown.

Figure 3:
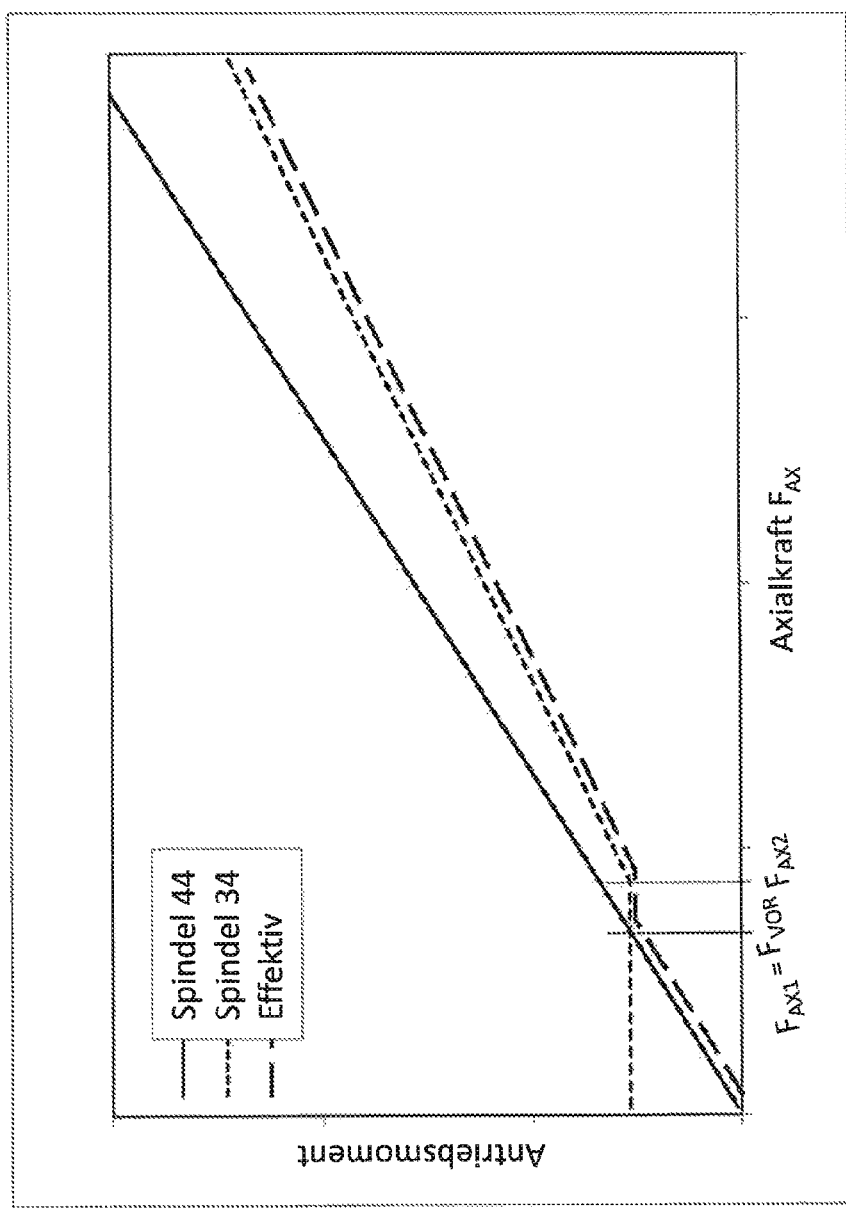
FIG. 3 shows a force diagram for explaining the mode of operation of the motor vehicle brake according to the invention.

This mode of operation is explained in the graphic according to FIG. 3, which plots the drive torque required by the motor as a function of the axial force FAX acting on the piston. The solid line shows the characteristic solely for the spindle-nut pair made up of the nut 64 and the nut section 44 (spindle 44 for short), which with its external thread 60 acts as a spindle. The dashed line depicted with short line segments shows the characteristic for the spindle-nut pair made up of the spindle 34 and the two nut sections 44 and 52, referred to as the spindle 34 for short. The dashed line depicted with long line segments shows the effective (combined) characteristic of the overall spindle-nut arrangement 31.

According to the present description, initially the spindle 44 is active. The spindle 34 remains inactive, so to speak, due to the nut sections 44, 52 braced on it. This corresponds to the first actuating phase (essentially, passing through the clearance x). A switchover point is reached as soon as the acting axial force FAX is equal to the pretensioning force FVOR which acts via the compression springs 56, 58. As a result, the drive torque is briefly utilized to release the spring tension, until ultimately only the spindle 34 is still active at a further inflection point FAX2. The brake is subsequently clamped upon brake activation (second actuating phase). The graphic thus shows that initially the spindle 44 with its large thread pitch may be utilized for bridging the clearance, and a switchover to the spindle 34 having a smaller thread pitch subsequently takes place as a function of the axial force, in order to achieve correspondingly higher axial forces with lower drive torque.

The invention makes it possible, using a lower-power electric motor drive that may be designed with correspondingly smaller dimensions, to achieve a rapid brake application movement for bridging the clearance as well as a sufficiently strong clamping of the brake with large axial forces.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. A motor vehicle brake adapted to be actuated in a combined hydraulic and electromechanical manner, having an actuator assembly comprising:
   a housing,
   an actuating element that is displaceable relative to the housing along a longitudinal axis for a hydraulic or electromechanical displacement of a brake lining,
   a motor drive, and
   a displacement mechanism, situated between the motor drive and the actuating element, for displacing the actuating element, wherein the displacement mechanism has a multi-stage spindle-nut arrangement comprising a first spindle-nut pair having a first thread pitch and a second spindle-nut pair having a second thread pitch, wherein the first thread pitch is larger than the second thread pitch, wherein, during an electromechanical actuation of the motor vehicle brake, the first spindle-nut pair is active in a first actuating phase and the second spindle-nut pair is active in a second actuating phase, and
   wherein the second spindle-nut pair has a second spindle and a second nut, the second nut being coupleable to the actuating element in a rotatably fixed manner, and the second spindle being rotatably drivable by the motor drive,
   wherein the second nut of the second spindle-nut pair has two parts, a first nut section being coupled in a rotatably fixed manner to a second nut section via a connecting pin, but being displaceable relative to the second nut section in an axial direction, the first nut section and the second nut section being stretched apart from one another in the axial direction via a compression spring mechanism.

2. The motor vehicle brake according to claim 1, wherein the transition from the first actuating phase to the second actuating phase is determined by an axial force threshold value acting on the actuating element.

3. The motor vehicle brake according to claim 2, wherein the axial force threshold value is dimensioned such that during the first actuating phase, the actuating element is displaceable for passing through a brake clearance, and during the second actuating phase, the actuating element is displaceable for building up a desired brake force.

4. The motor vehicle brake according to claim 1, wherein the first spindle-nut pair has a first spindle and a first nut, the first nut being rotatably fixed relative to the actuating element, and the first spindle being rotatably drivable by the motor drive.

5. The motor vehicle brake according to claim 2, wherein an axial elastic force exerted by the compression spring mechanism is dimensioned for stretching apart the first and second nut sections for setting the axial force threshold value.

6. The motor vehicle brake according to claim 1, wherein the first spindle of the first spindle-nut pair is coupled in a rotatably fixed manner to the second nut section of the second nut of the second spindle-nut pair, or is formed in one piece with same.

7. The motor vehicle brake according to claim 1, wherein the first spindle-nut pair has a self-locking design or a ball screw drive.

8. The motor vehicle brake according to claim 1, wherein the second spindle-nut pair has a self-locking design.

9. The motor vehicle brake according to claim 1, wherein a multi-stage gear system, situated between the motor drive and the spindle-nut arrangement, is associated with the displacement mechanism.

10. The motor vehicle brake according to 1, wherein the first spindle-nut pair has a first spindle and a first nut, the first nut being accommodated in the actuating element in a rotatably fixed manner or formed in one piece therewith, and the first spindle being rotatably drivable by the motor drive.

11. The motor vehicle brake according to claim 7, wherein the self-locking design is configured as a tapered thread or trapezoidal thread.

12. The motor vehicle brake according to claim 8, wherein the self-locking design is configured as a tapered thread or a trapezoidal thread.

* * * * *